US010318172B2

(12) United States Patent
Day

(10) Patent No.: US 10,318,172 B2
(45) Date of Patent: Jun. 11, 2019

(54) CACHE OPERATION IN A MULTI-THREADED PROCESSOR

(71) Applicant: MIPS Tech, LLC, Santa Clara, CA (US)

(72) Inventor: Philip Day, Woolwich (GB)

(73) Assignee: MIPS Tech, LLC, Campbell, CA (US)

( * ) Notice: Subject to any disclaimer, the term of this patent is extended or adjusted under 35 U.S.C. 154(b) by 0 days.

(21) Appl. No.: 14/873,027

(22) Filed: Oct. 1, 2015

(65) Prior Publication Data
US 2016/0299700 A1    Oct. 13, 2016

(30) Foreign Application Priority Data
Apr. 9, 2015    (GB) ..................... 1506062

(51) Int. Cl.
*G06F 12/08*    (2016.01)
*G06F 3/06*    (2006.01)
*G06F 12/0842*    (2016.01)

(52) U.S. Cl.
CPC .......... *G06F 3/0611* (2013.01); *G06F 3/0638* (2013.01); *G06F 3/0673* (2013.01);
(Continued)

(58) Field of Classification Search
CPC .... G06F 3/0611; G06F 3/0638; G06F 3/0673; G06F 12/0842
See application file for complete search history.

(56) References Cited

U.S. PATENT DOCUMENTS 5,682,495 A * 10/1997 Beavers .............. G06F 12/1036
711/207
6,427,192 B1   7/2002 Roberts
(Continued)

FOREIGN PATENT DOCUMENTS

JP    2002342163 A    11/2002
WO   2010111636 A1    9/2010

OTHER PUBLICATIONS

Albonest "Selective cache ways: on-demand cache resource allocation", MICRO-32. Proceedings of the 32nd. Annual ACM/IEEE International Symposium on Microarchitecture. Haifa, Israel, Nov. 16-18, 1999; [Proceedings of the Annual ACM/IEEE International Symposium on Microarchitecture], Los Alamitos, CA : IEEE Comp. SOC Nov. 16, 1999 (Nov. 16, 1999), pp. 248-259.
(Continued)

*Primary Examiner* — Ryan Bertram
*Assistant Examiner* — Trang K Ta
(74) *Attorney, Agent, or Firm* — Adams Intellex, PLC

(57) ABSTRACT

Cache operation in a multi-threaded processor uses a small memory structure referred to as a way enable table that stores an index to an n-way set associative cache. The way enable table includes one entry for each entry in the n-way set associative cache and each entry in the way enable table is arranged to store a thread ID. The thread ID in an entry in the way enable table is the ID of the thread associated with a data item stored in the corresponding entry in the n-way set associative cache. Prior to reading entries from the n-way set associative cache identified by an index parameter, the ways in the cache are selective enabled based on a comparison of the current thread ID and the thread IDs stored in entries in the way enable table which are identified by the same index parameter.

17 Claims, 10 Drawing Sheets

(52) U.S. Cl.
CPC .. *G06F 12/0842* (2013.01); *G06F 2212/1021* (2013.01); *G06F 2212/1028* (2013.01); *G06F 2212/22* (2013.01); *G06F 2212/601* (2013.01); *Y02B 60/1225* (2013.01); *Y02D 10/13* (2018.01)

(56) References Cited

U.S. PATENT DOCUMENTS

| | | | |
|---|---|---|---|
| 6,944,714 B2 * | 9/2005 | Lesarte | G06F 1/3225 365/189.05 |
| 2003/0014597 A1 * | 1/2003 | van de Waerdt | G06F 12/0864 711/136 |
| 2004/0215882 A1 * | 10/2004 | Alexander | G06F 12/0864 711/128 |
| 2005/0160228 A1 * | 7/2005 | Teruyama | G06F 12/127 711/133 |
| 2005/0223172 A1 * | 10/2005 | Bortfeld | G06F 12/04 711/125 |
| 2007/0288776 A1 | 12/2007 | DeMent et al. | |
| 2009/0282220 A1 * | 11/2009 | Norden | G06F 9/3001 712/205 |
| 2011/0153926 A1 | 6/2011 | Fang et al. | |
| 2011/0296112 A1 * | 12/2011 | Li | G06F 12/0864 711/128 |
| 2012/0290780 A1 * | 11/2012 | Kinter | G06F 12/0864 711/104 |
| 2012/0303897 A1 * | 11/2012 | Pullagoundapatti | G06F 12/0864 711/118 |
| 2013/0304991 A1 * | 11/2013 | Bottcher | G06F 12/0864 711/122 |
| 2015/0347297 A1 * | 12/2015 | Hagersten | G06F 12/0862 711/119 |
| 2016/0019158 A1 * | 1/2016 | Palacharla | G06F 12/0893 711/129 |
| 2016/0103769 A1 * | 4/2016 | Glickman | G06F 12/1081 711/6 |
| 2016/0328320 A1 * | 11/2016 | Dooley | G06F 12/0864 |

OTHER PUBLICATIONS

Settle et al. "A Dynamically Reconfigurable Cache for Multithreaded Processors", Journal of Embedded Computing—Issues in Embedded Single-Chip Multicore Architectures, vol. 2, Apr. 2, 2006 (Apr. 2, 2006), pp. 221-233.

Chiou et al "Application-Specific Memory Management for Embedded Systems Using Software-Controlled Caches", ACM IEEE Design Automation Conference Proceedings, Jun. 5, 2000 (Jun. 5, 2000), pp. 416-419.

Anonymous: "Multithreading (computer architecture)—Wikipedia, the free encyclopedia", Jan. 6, 2015 (Jan. 6, 2015), pp. 1-5.

Li et al "Thread ID based power reduction mechanism for multi-thread shared set-associative caches", 2015 Sixth International Green and Sustainable Computing Conference (IGSC), IEEE, Dec. 14, 2015 (Dec. 14, 2015), pp. 1-4.

* cited by examiner

CACHE OPERATION IN A MULTI-THREADED PROCESSOR

BACKGROUND

A cache is used to reduce the average time needed to access data or instructions from a main memory of a computing system. When a processor needs to read from or write to a location in main memory, it first checks whether a copy of that data is in the cache. If so, the processor immediately reads from or writes to the cache, which is much faster than reading from or writing to main memory. Where in the cache a copy of a particular entry of main memory will go is decided by a replacement policy. If the replacement policy is free to choose any entry in the cache to hold the copy, the cache is called fully associative. At the other extreme, if each entry in main memory can go in just one place in the cache, the cache is described as direct mapped. Many caches implement a compromise in which each entry in main memory can go to any one of n places in the cache, and are described as n-way set associative. FIG. 1 is a schematic diagram of a 2-way set associative cache 100. Each index position or line 101 in the cache (e.g. each row in the representation shown in FIG. 1) comprises two entries, one in each of the ways 102 (i.e. way 0), 103 (i.e. way 1). Each entry of a way comprises a data field 104, 106 and a cache tag field 108, 110. Where the cache 100 is used to cache values from a larger memory device (i.e. the cache is a data cache), a given memory location can be mapped to two possible locations, i.e. an entry in way 0 or an entry in way 1, with the index often corresponding to the least significant bits of the memory location and the cache tag (which is stored in an entry) corresponding to the most significant bits of the memory location. When storing data in the cache 100, if one of the entries at the required index is empty, that entry is used, but if both of the entries are filled, one of the two entries is overwritten. A replacement algorithm such as 'least recently used' (LRU) may, for example, be used to determine which entry to overwrite.

When reading data from such a cache 100, the data from all of the ways of the cache may be read in the same clock cycle and then the cache tags are then examined to determine which entry contains the required data item and the other data items are discarded. Alternatively, all the tags (from all the ways of the cache) may be read in a first clock cycle and then the data from the entry with the matching tag is read in a second clock cycle.

For a multi-threaded processor, the data items stored in an n-way set associative cache (such as a jump register cache or instruction cache) may be specific to a particular thread and as a result of the replacement algorithm used to determine where new data items are stored in the cache, there may be no fixed mapping between particular ways and particular threads. Consequently each entry in the cache (i.e. each entry in each way of the cache) comprises a thread identifier (or thread ID). The thread ID may be incorporated as part of the tag or may be provided in a separate field. A thread ID in a cache entry is the identifier for a thread to which the data belongs, i.e. it is the thread which requested/requires the data item (e.g. the thread for which the data was being fetched when the cache entry was written). When reading from a cache which comprises many ways (e.g. an n-way set associative cache) an entry from all of the ways of the cache is fetched and then the tag and thread ID are examined to determine which entry contains the required data item (where, as described above, in some implementations the thread ID may be incorporated within the tag field rather than being a separate field). This is power inefficient for a RAM based cache (i.e. a cache implemented as a RAM), because it is necessary to power up every way each time data is read even though one or more of the ways may comprise data which is for another thread (and hence cannot contain relevant data). Furthermore, it is data inefficient because irrelevant data for another thread is retrieved.

The embodiments described below are provided by way of example only and are not limiting of implementations which solve any or all of the disadvantages of known cache arrangements and methods of operating caches in multi-threaded processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Cache operation in a multi-threaded processor is described. A small memory structure referred to as a way enable table is provided which stores an index to an n-way set associative cache. The way enable table comprises one entry for each entry in the n-way set associative cache and each entry in the way enable table is arranged to store a thread ID. The thread ID in an entry in the way enable table is the ID of the thread associated with a data item stored in the corresponding entry in the n-way set associative cache. Prior to reading entries from the n-way set associative cache identified by an index parameter, the ways in the cache are selective enabled based on a comparison of the current thread ID and the thread IDs stored in entries in the way enable table which are identified by the same index parameter.

A first aspect provides a multi-threaded processor comprising: a set associative cache comprising a plurality of cache entries arranged in a plurality of ways, each cache entry comprising a data field and a tag field; a way enable table comprising a plurality of way enable table entries, each way enable table entry corresponding to a cache entry in the set associative cache and comprising a thread ID field arranged to store a thread ID for a thread associated with a data item stored in the data field of the corresponding cache entry; and hardware logic arranged to selectively enable ways in the set associative cache based at least in part on a comparison of a current thread ID and thread IDs stored in way enable table entries identified by an index parameter.

A second aspect provides a method of accessing a set associative cache in a multi-threaded processor, the set associative cache comprising a plurality of cache entries arranged in a plurality of ways and each cache entry comprising a data field and a tag field, the method comprising: accessing two or more way enable table entries in a way enable table identified by an index parameter, each way enable table entry corresponding to a cache entry in the set associative cache and comprising a thread ID field arranged to store a thread ID for a thread associated with a data item stored in the data field of the corresponding cache entry; for each accessed way enable table entry, comparing the stored thread ID and a current thread ID; and in response to the comparison identifying a match between the current thread ID and the stored thread ID in a way enable table entry, enabling the way in the set associative cache containing the corresponding cache entry.

A third aspect provides a computer readable storage medium having stored thereon computer readable program code for generating a multi-threaded processor comprising: a set associative cache comprising a plurality of cache entries arranged in a plurality of ways, each cache entry comprising a data field and a tag field; a way enable table comprising a plurality of way enable table entries, each way enable table entry corresponding to a cache entry in the set associative cache and comprising a thread ID field arranged to store a thread ID for a thread associated with a data item stored in the data field of the corresponding cache entry; and hardware logic arranged to selectively enable ways in the set associative cache based at least in part on a comparison of a current thread ID and thread IDs stored in way enable table entries identified by an index parameter.

A fourth aspect provides a computer readable storage medium having encoded thereon computer readable program code for generating a processor configured to perform a method of accessing a set associative cache in a multi-threaded processor, the set associative cache comprising a plurality of cache entries arranged in a plurality of ways and each cache entry comprising a data field and a tag field, the method comprising: accessing two or more way enable table entries in a way enable table identified by an index parameter, each way enable table entry corresponding to a cache entry in the set associative cache and comprising a thread ID field arranged to store a thread ID for a thread associated with a data item stored in the data field of the corresponding cache entry; for each accessed way enable table entry, comparing the stored thread ID and a current thread ID; and in response to the comparison identifying a match between the current thread ID and the stored thread ID in a way enable table entry, enabling the way in the set associative cache containing the corresponding cache entry.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
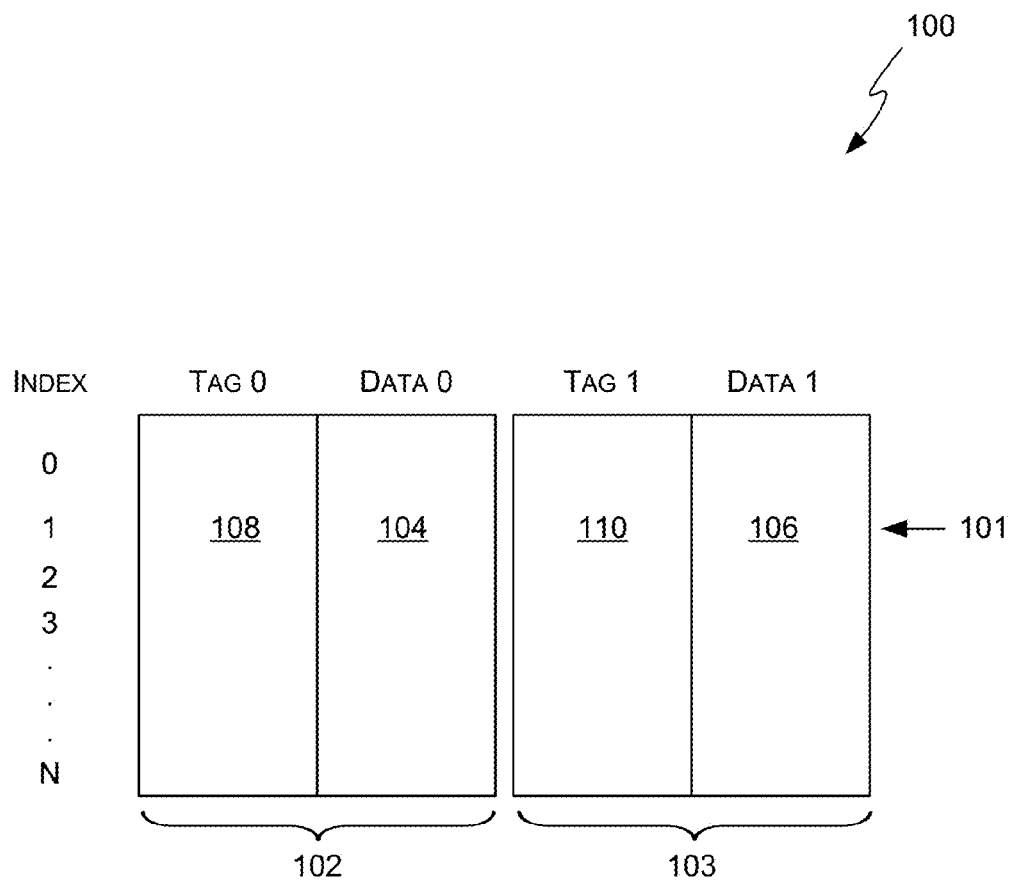
FIG. 1 is a schematic diagram of a 2-way set associative cache.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein is an improved cache arrangement for a multi-threaded processor and method of operating a cache in a multi-threaded processor which involves selectively enabling ways and which is more power efficient for a RAM based cache and more data efficient. A small memory is provided (e.g. in registers) which stores an index to the cache in the form of a thread ID for each entry for each way of the cache and which is indexed in the same way as the cache itself. This may be referred to as the 'way enable table'. Prior to accessing the cache, the current thread for which an entry is being fetched is compared against the thread IDs for each corresponding entry for each way (i.e. those entries which correspond to the index position or line in the cache) in the way enable table. This identifies the ways in the cache that contain relevant data for that particular thread (i.e. those ways that store a thread ID that matches the current thread being fetched) and the ways in the cache can then be selectively enabled/disabled so that the irrelevant ways (i.e. those ways where the thread ID does not match the current thread being fetched) are not powered up to be read. This saves power and also guarantees that data which is definitely irrelevant is not read (there may be some irrelevant data which is read because it has a matching thread ID but not a matching tag).

The parameter which is used to index both the cache and the small memory (i.e. both the main cache and the way enable table) and identify a cache line (or index position) is referred to as the 'index' or 'index parameter'. As described in more detail below, when implementing the arrangement and methods described herein, the cache may be unchanged or the cache may be modified so that it no longer contains the thread ID for each entry (either as part of the cache tag or as a separate field).

Figure 2:
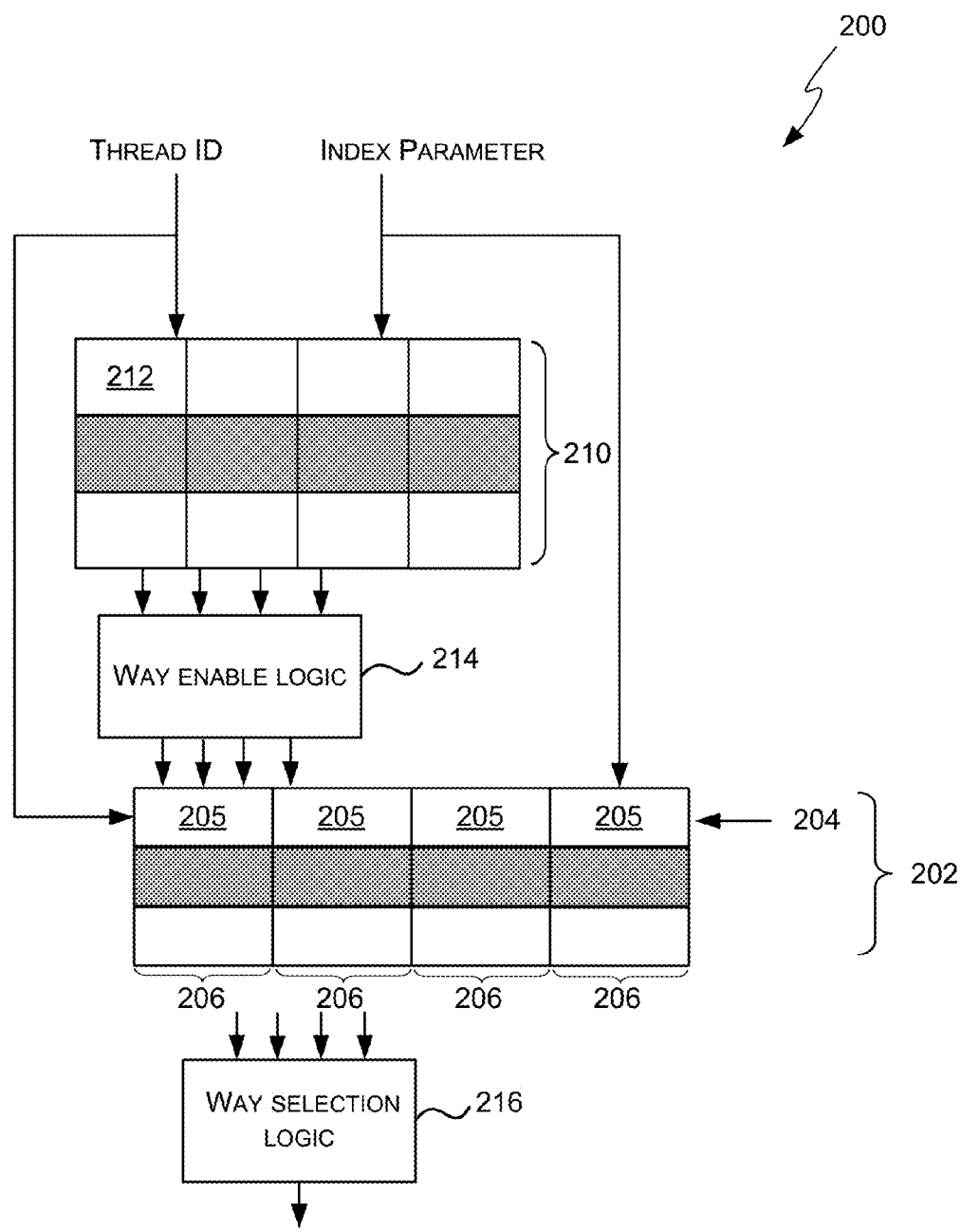
FIG. 2 is a schematic diagram of an improved cache arrangement in accordance with one aspect of the present invention.
Figure 3:
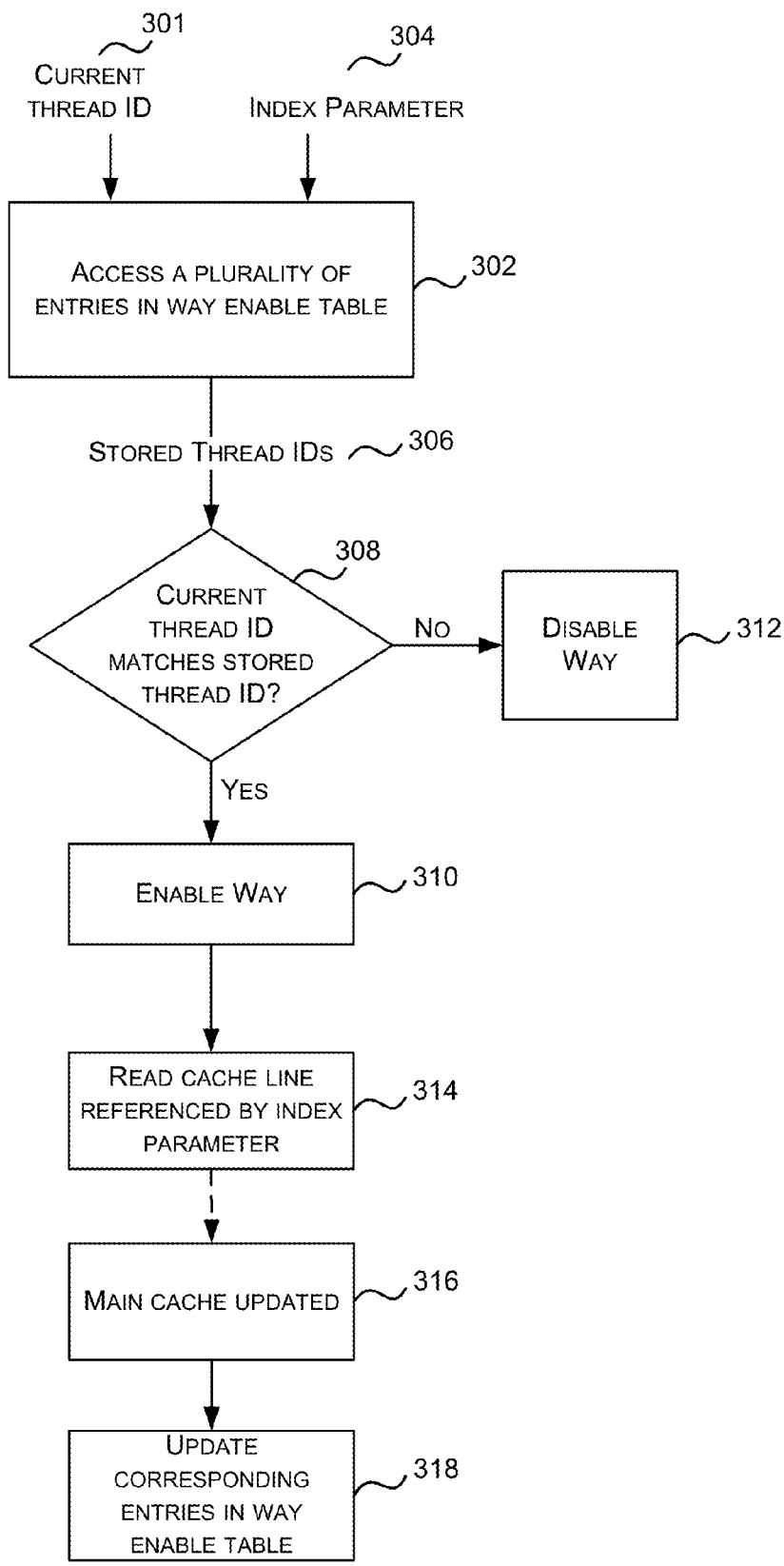
FIG. 3 is a flow diagram of an example method of operation of the improved cache arrangement shown in FIG. 2.

FIG. 2 is a schematic diagram of an improved cache arrangement 200 and FIG. 3 is a flow diagram of an example method of operation of the improved cache arrangement shown in FIG. 2. The improved cache arrangement 200 comprises the cache 202 which comprises n-ways (where in the example shown, n=4) and in which the data items (which may be instructions, target addresses, copies of data items stored in memory, etc.) are stored. Each cache line or index position 204 in the cache 202 comprises one entry 205 in each of the ways 206 and each entry 205 comprises a data field and a tag field. Depending on the type of cache, the data field may, for example, be used to store an instruction (e.g. for an instruction cache), a target prediction program counter (PC, e.g. for a jump register cache), a data item from memory (e.g. for a data cache), etc. A cache line or index position 204 is identified (or referenced) using an index parameter which may, for example, correspond to a (proper) subset of the bits of a memory location for a data cache (e.g. the least significant bits) or a (proper) subset of the bits of a program counter (PC) for an instruction cache or jump register cache (e.g. the least significant bits of the PC).

The improved cache arrangement 200 further comprises a way enable table 210 which comprises one entry 212 for each entry 205 in the cache (i.e. there are the same number of entries in both the cache 202 and the way enable table 210) such that there is a 1:1 relationship between entries 205 in the cache 202 and entries 212 in the way enable table 210. In the example shown in FIG. 2, the cache 202 comprises 12 entries (three cache lines, each comprising 4 entries as n+4) and the way enable table 210 also comprises 12 entries. Each entry 212 in the way enable table 210 comprises a thread ID field.

The same index parameter is used to identify (or reference) a cache line 204 in the cache 202 and the corresponding entries in the way enable table 202, i.e. for an instruction or jump register cache, both the cache (i.e. the instruction or jump register cache) and the way enable table are indexed by a cache parameter comprising a subset of the bits of a program counter (e.g. the least significant bits). For example, if a first cache line in the cache 202 is identified using an index parameter A, the corresponding entries in the way enable table are also identified using the index parameter A.

The improved cache arrangement 200 additionally comprises way enabling hardware logic 214 which is arranged to selectively enable/disable one or more of the ways 206 in the cache 202 such that the disabled (or non-enabled) ways are not powered up to be read when a cache line is subsequently read from the cache.

The improved cache arrangement 200 may further comprise way selection hardware logic 216 which is arranged to analyse the tags of entries which have been read to determine which entry comprises the required data item (e.g. to compare the cache tag to the current PC). Compared to known systems, which also comprise way selection hardware, the way selection hardware logic 216 in the improved cache arrangement 200 may discard less data because data from disabled ways will not be read.

As shown in FIG. 3, when fetching a data item (which may be an instruction, a target prediction PC, an item from memory, etc.) from the cache 202 for use by a thread (referred as the 'current thread' and identified by the 'current thread ID' 301), a plurality of entries 212 in the way enable table 210 are accessed (block 302) using an index parameter 304. The plurality of cache entries 212 which are accessed (in block 302) correspond to the entries in the cache line in the cache 202 which is referenced by the index parameter 304. For example, if the index parameter 304 references the second cache line in the cache 202 (which is shaded in FIG. 2), the four shaded entries in the way enable table 210 are accessed (in block 302).

As described above, each accessed entry in the way enable table 210 comprises a thread ID. These stored thread IDs 306 (accessed in block 302) are then compared (in the way enabling hardware logic 214) against the current thread ID 301 (block 308), i.e. against the thread ID of the thread for which the data is being fetched. If a stored thread ID matches the current thread ID ('Yes' in block 308) then the way 206 comprising the corresponding entry in the cache 202 is enabled (block 310), whereas if a stored thread ID does not match the current thread ID ('No' in block 308), the way 206 comprising the corresponding entry in the cache 202 is disabled/not enabled (block 312). The comparison (in block 308) is therefore performed once for each of the ways in the cache 202 (e.g. n times where the cache is an n-way set associative cache) and depending upon the outcome of the comparisons (in block 308) a way is either enabled (in block 310) or disabled/not enabled (in block 312).

For example, if the four shaded entries in the way enable table 210 comprise the thread IDs 0,1,0,0 and the current thread ID is 1, then only the second way in the cache 202 will be enabled (in block 310) and the other three ways will be disabled/not enabled (in block 312). However, if the current thread ID is 0, then three out of the four ways (the first, third and fourth ways) will be enabled and only the second way will be disabled/not enabled.

Having selectively enabled/disabled ways 206 in the cache 202 (in blocks 308-312) based on thread ID (i.e. based on a comparison of the thread IDs stored in corresponding entries in the way enable table 210 and the current thread ID 301), a subsequent cache read operation (block 314) will only read entries in the cache line referenced by the index parameter 304 from those ways 206 in the cache which are enabled. Referring back to the earlier example, if the current thread ID is 1, a single entry will be read from the second way and if the current thread ID is 0, three entries will be read from the first, third and fourth ways.

Having read one or more entries from the cache (in block 314), the way selection logic 216 reads the tags in those entries to determine whether the entry contains the data that is required or not and where the tags do not match, the entries are discarded (as in current cache implementations).

In the event of a cache miss (i.e. where none of the tags match), the data that is required is obtained from elsewhere (e.g. read from main memory or computed) and this data may be written to the cache. Each time that the cache is updated (block 316) e.g. as a consequence of a cache miss or for any other reason, the way enable table is also updated (block 318) to identify the thread associated with the cache update (e.g. the thread for which the data item was fetched). In particular, where an entry in the cache is updated (in block 316), the corresponding entry in the way enable table is also updated (in block 318).

Although FIG. 3 and the description above refers to enabling and disabling ways, it will be appreciated that in some examples ways may be enabled by default and may be disabled as a result of the comparison (in block 308) or ways may be disabled by default and may be enabled as a result of the comparison (in block 308). Furthermore the terms 'disabled' and 'not enabled' are used herein interchangeably.

By using the cache arrangement 200 shown in FIG. 2 and the method as shown in FIG. 3, those ways in the cache which contain entries for the wrong thread (i.e. for threads which do not match the current thread ID 301) are not powered up when the cache line is read. This reduces the power consumption of the cache. As each entry in the way enable table comprises many fewer bits than an entry in the cache, the way enable table does not occupy much physical area in a processor and in various examples may be implemented in registers rather than RAM. Where registers are used to implement the way enable table 210, no additional power is used to read entries from it (unlike reading data from a RAM).

The cache 202 in FIG. 2 may, for example, be an instruction cache or a jump register cache (JRC) within a multi-threaded processor; however, the methods of way selection may also be used for other types of cache in a multi-threaded processor (e.g. for data caches), where the multi-threaded processor may operate in-order or out-of-order.

Figure 4:
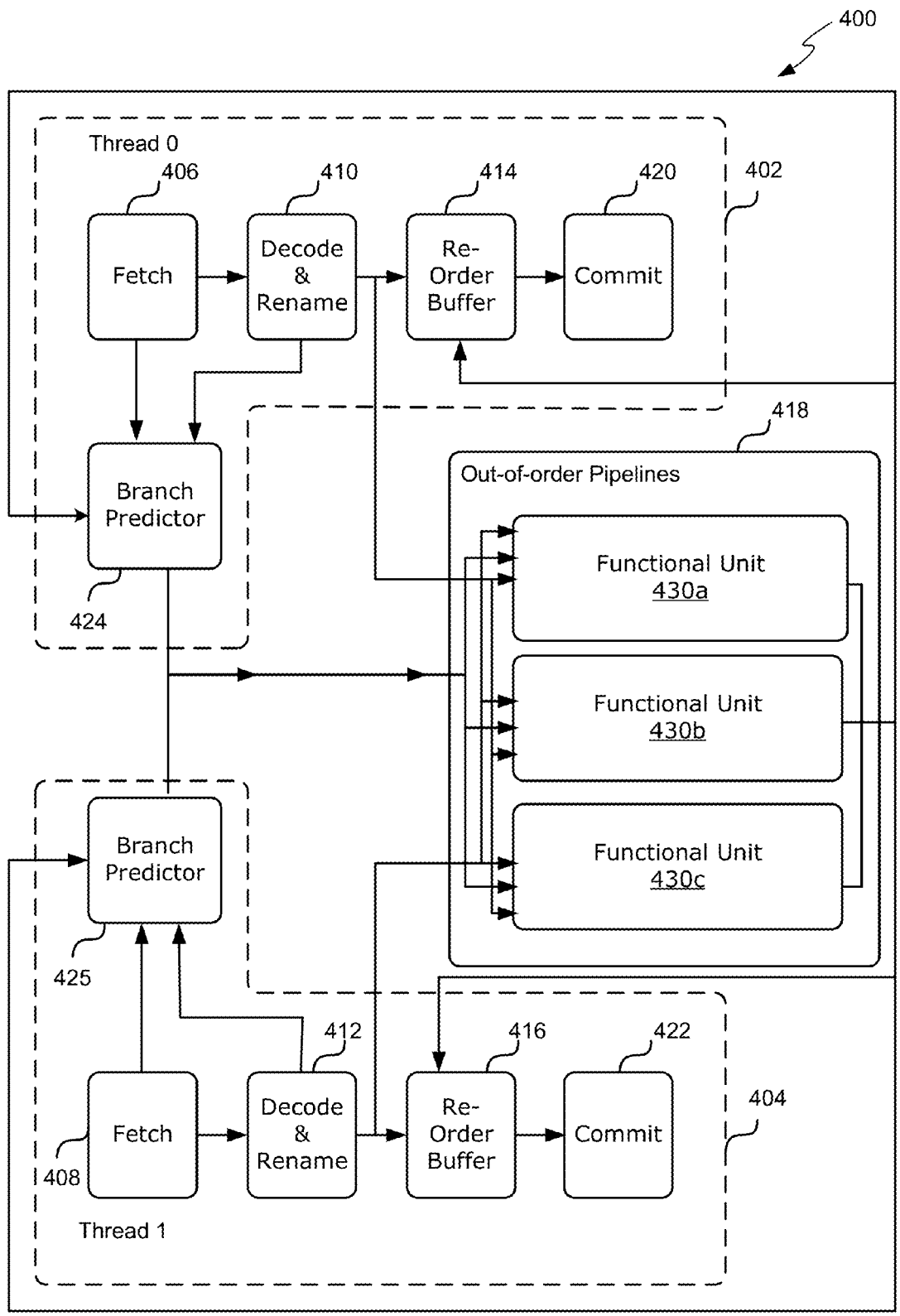
FIG. 4 shows a schematic diagram of an example multi-threaded out-of-order processor.

FIG. 4 shows a schematic diagram of an example multi-threaded out-of-order processor 400 in which the methods of selective way enabling (e.g. as in FIG. 3) and the improved cache arrangement (e.g. as in FIG. 2) described herein may be implemented. Although FIG. 4 shows a multi-threaded out-of-order processor, the methods may also be implemented in a multi-threaded processor which does not process instructions out-of-order, i.e. in a multi-threaded in-order processor. In this example the multi-threaded processor 400 is a two-threaded processor; however the methods are also applicable to multi-threaded processors with different numbers of threads (e.g. four or more threads).

Each thread 402 and 404 comprises a fetch stage 406 or 408 configured to fetch instructions from a program (in program order) as indicated by a program counter (PC) and a decode and renaming stage 410 or 412 arranged to interpret the instructions and perform register renaming. As is known to those of skill in the art register renaming enables more instructions to be executed out-of-order, by removing certain dependencies, such as write-after-read (WAR) dependencies. The improved cache arrangement and method of accessing a cache which involves selectively enabling ways in a cache, as described herein, may be implemented within the fetch stage 406 or 408 (e.g. as is described in more detail below).

After an instruction passes through the renaming stage 410 or 412, it is (a) provided to the plurality of out-of-order pipelines 418 for execution; and (b) inserted into a reorder buffer 414 or 416 (ROB). The re-order buffer 414 or 416 is a buffer that enables the instructions to be executed out-of-order, but committed in-order. The re-order buffer 414 or 416 holds the instructions that are inserted into it in program order, but the instructions within the ROB 414 or 416 can be executed out of sequence by the out-of-order pipelines 418. Instructions are output from the re-order buffer 414 or 416 to a commit stage 420 or 422 in program order after they have been executed by the out-of-order pipelines 418. The commit stage 420 or 422 then commits the results of the instruction to the register/memory.

Each thread 402 and 404 also comprises a branch predictor 424 or 425, which is configured to predict which direction the program flow will take in the case of instructions known to cause possible flow changes, such as a branch instruction. Branch prediction is useful as it enables instructions to be speculatively executed by the processor 400 before the outcome of the branch instruction is known. Each branch predictor 424 or 425 may be in communication with the corresponding fetch stage 406 or 408, decode and renaming stage 410 or 412, and/or the out-of-order pipelines 418. For example, the fetch stages 406 and 408 may use information from the corresponding branch predictor 424 or 425 to determine which instruction to fetch next; the decode and renaming stages 410 and 412 may provide information to the branch predictor 424 or 425 indicating which instructions are branch instructions (in other cases the instructions may be decoded in the fetch stage 406 or 408); and the out-of-order pipelines 418 may provide the branch predictors 424 and 425 with information indicating updates to the program counter.

As shown in FIG. 4, the out-of-order pipelines 418 may comprise a plurality of functional (or execution) units 430a, 430b or 430c. Each functional unit 430a, 430b, and 430c is responsible for executing instructions and may comprise one or more functional unit pipelines. The functional units 430a, 430b, and 430c may be configured to execute specific types of instructions. For example one or more functional units 430a, 430b and 430c may be a load/store unit, an integer unit, a floating point unit (FPU), a digital signal processing (DSP)/single instruction multiple data (SIMD) unit, or a multiply accumulate (MAC) unit. A load/store unit performs load and store memory instructions, an integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The functional units and the pipelines therein may have different lengths and/or complexities. For example, a FPU pipeline is typically longer than an integer execution pipeline because it is generally performing more complicated operations.

The multi-threaded processor 400 may also comprise functional elements other than those shown in FIG. 4 (e.g. caches, memory, register files, etc.). It will be appreciated that other processors may not comprise all the functional elements shown in FIG. 4 (i.e. one or more of the functional elements shown in FIG. 4 may be omitted, e.g. the branch predictor 424, 425 may be omitted).

The multi-threaded processor 400 may comprise a jump register cache (JRC or JR cache) and/or an instruction cache (I cache) within a fetch stage 406 or 408. The instruction cache is used to speed up executable instruction fetch i.e. so that the thread does not have to stall until the instruction is fetched from main memory (which is slower to access than the I cache). The JR cache is a structure that enables prediction of the target address for register based jump instructions so that the fetch stage (or fetch unit) can speculatively fetch whilst the execution unit (i.e. the functional units 430a-430c) retrieves the actual target address from the register and sends a redirection notice. Both the I cache and the JR cache are typically indexed using the program counter (PC); however, different subsets of the bits in the PC may be used to index the I cache and the JR cache.

Figure 5:
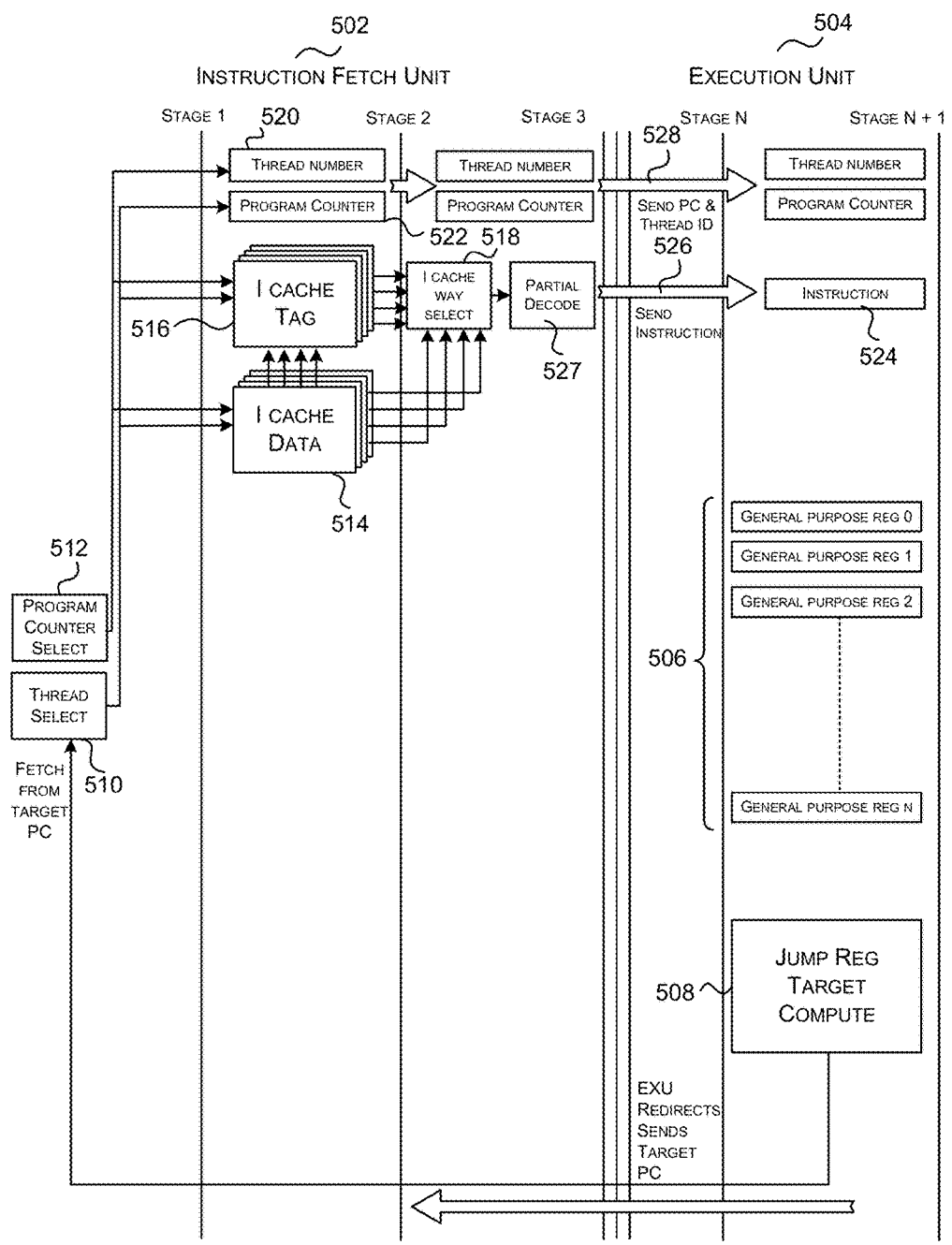
FIG. 5 shows a schematic diagram of a basic pipeline within a multi-threaded processor.

The operation of a multi-threaded processor, such as the processor 400 shown in FIG. 4, without use of JRC or selective way enabling can be described with reference to FIG. 5. FIG. 5 shows a schematic diagram of a basic pipeline within a multi-threaded processor which comprises a fetch unit (or stage) 502 and an execution unit 504. The fetch unit 502 comprises an instruction cache and the execution unit 504 comprises a plurality of general purpose registers 506 along with hardware logic 508 for computing a target address for a jump instruction.

As shown in FIG. 5, the fetch unit 502 selects a thread (using hardware logic 510) and a program counter of an instruction to fetch for the selected thread (using hardware logic 512). As described above, the instruction cache is accessed using an index parameter which comprises the least significant bits of the PC and using the PC selected (using logic 512) one entry is read from each of the ways in the cache line identified by the PC. Each of these entries comprises a tag field and a data field and in the example shown in FIG. 5, there are 4 ways and so four data fields 514 and four tag fields 516 are read. This requires that all the ways in the instruction cache are powered up. The tag fields in a multi-threaded processor may comprise the most significant bits of the PC and the thread ID or the thread ID may be stored in a separate field which is also read.

The way selection hardware logic 518 then compares the selected thread ID 520 and the selected PC 522 to the accessed tag fields 516 (and an additional thread ID field, where this is not included within the tag field 516). If there is a match between the selected thread ID 520 and the selected PC 522 and the accessed tag fields 516 (and an additional thread ID field, where this is not included within the tag field 516), the corresponding data field 514 (i.e. the data field 514 from the same cache entry as the matching tag field 516) contains the required instruction. This instruction 524 is forwarded to the execution unit (arrow 526) along with the selected thread ID 520 and the selected PC 522 (arrow 528).

Where the instruction 524 is a jump instruction (as identified in the partial decode block 527), the execution unit 504 retrieves the target address (i.e. the target PC) from the corresponding general purpose register 506 using hardware logic 508 and sends a redirection notice (arrow 530) containing the target PC to the fetch unit 502.

Figure 6:
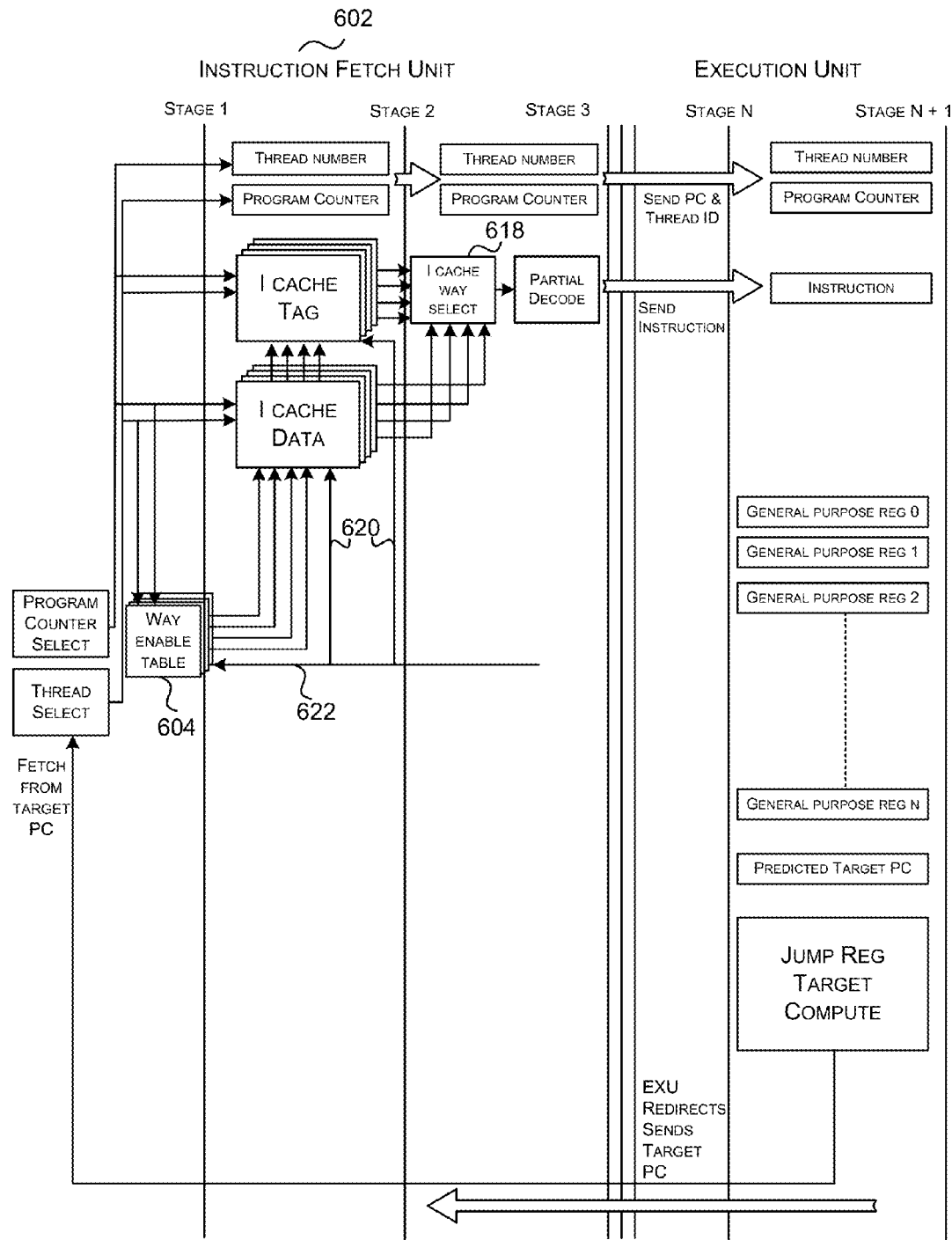
FIG. 6 shows the operation of a multi-threaded processor which uses selective way enabling for the instruction cache.

In contrast to FIG. 5, FIG. 6 shows the operation of a multi-threaded processor, such as the processor 400 shown in FIG. 4, which uses selective way enabling for the instruction cache. In FIG. 6, the fetch unit 602 additionally comprises a way enable table 604 and selective way enabling hardware logic 606.

As shown in FIG. 6, the fetch unit 602 selects a thread (using hardware logic 510) and a program counter of an instruction to fetch for the selected thread (using hardware logic 512). The way enable table 604 is accessed using an index parameter which comprises the least significant bits of the PC. Using the selected PC 522 (which was selected in logic 512) n entries are read from the way enable table 604, where the n entries which are read correspond to the n entries (one in each of n ways) in a cache line in the instruction cache identified using the same index parameter. Each of these n entries read from the way enable table 604 comprises a thread ID field and in the example shown in FIG. 6, there are 4 ways (n=4) and so four thread ID fields are read.

As described above with reference to FIGS. 2 and 3, the way enabling hardware logic compares the current thread ID (or thread number) 520 (as selected in logic 510) to the thread IDs in each of the n entries which were read from the way enable table 604 (where some of these entries may contain a thread ID and some may be empty) and where there is a match, the corresponding way in the instruction cache is enabled. Where there is no match, the corresponding way in the instruction cache is not enabled/disabled. As described above, the phrase 'corresponding way' refers to the way containing the entry in the instruction cache which corresponds to the particular entry in the way enable table (where there is a 1:1 relationship between entries in the way enable table and the instruction cache itself).

The instruction cache is then accessed using the same index parameter as was used to access the way enable table 604 and one or more entries may be read from the instruction cache. As described above, each of these entries comprises a tag field and a data field, but unlike the example shown in FIG. 5, even though there are still 4 ways, not all of these ways may be enabled (as a result of the actions of the way enabling logic based on the thread IDs stored in the way enable table 604) and so fewer than 4 entries (and so fewer than four data fields 514 and four tag fields 516) may be read. It will be appreciated that if all the thread IDs in the n entries read from the I way enable table 604 match the current thread ID 520, then 4 entries will be read from the instruction cache; however, in a multi-threaded processor this is unlikely to occur often as generally there will be an approximately equal distribution between the threads.

The way selection hardware logic 618 then compares the selected PC 522 to the accessed tag fields 516 (unlike in FIG. 5, there is no need to perform a comparison of the thread IDs). If there is a match between the selected PC 522 and the accessed tag fields 516, the corresponding data field 514 (i.e. the data field 514 from the same cache entry as the matching tag field 516) contains the required instruction. As in FIG. 5, this instruction is forwarded to the execution unit along with the selected thread ID 520 and the selected PC 522 (arrow 528).

As described above, in the event of a cache miss (i.e. where none of the tags match), the data that is required (i.e. the data field containing the required instructions) is obtained from elsewhere (e.g. read from memory or computed) and this data may be written to the cache (arrow 620) and the corresponding entry in the way enable table is also updated (arrow 622).

Where the instruction 524 is a register based jump instruction, the execution unit 504 retrieves the target address (i.e. the target PC) from the corresponding general purpose register using hardware logic 508 and sends a redirection notice containing the target PC to the fetch unit 602.

Figure 7:
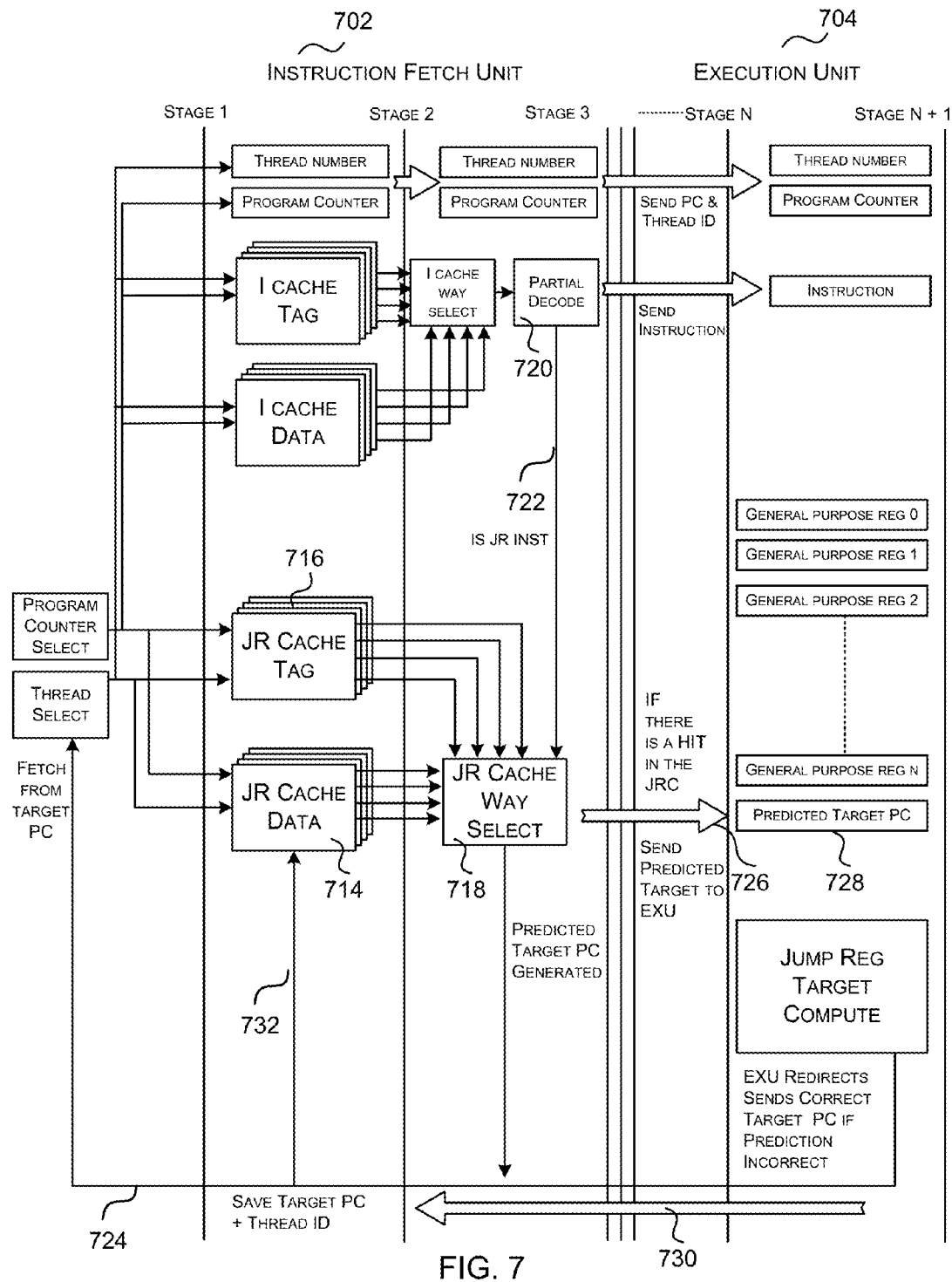
FIG. 7 shows the operation of a multi-threaded processor which comprises a jump register cache.

FIG. 7 shows the operation of a multi-threaded processor, such as the processor 400 shown in FIG. 4, which is a further variation on that shown in FIG. 5. In the example shown in FIG. 7, the processor comprises a jump register cache but, like FIG. 5, does not use selective way enabling for the instruction cache or for the jump register cache.

As shown in FIG. 7, the fetch unit 702 selects a thread (using hardware logic 510) and a program counter of an instruction to fetch for the selected thread (using hardware logic 512). As described above, the instruction cache is accessed using an index parameter which comprises the least significant bits of the PC and using the PC selected (using logic 512) one entry is read from each of the ways in the cache line identified by the PC. Each of these entries comprises a tag field and a data field and in the example shown in FIG. 7, there are 4 ways and so four data fields 514 and four tag fields 516 are read. This requires that all the ways in the instruction cache are powered up. The tag fields in a multi-threaded processor may comprise the most significant bits of the PC and the thread ID or the thread ID may be stored in a separate field which is also read.

The way selection hardware logic 518 then compares the selected thread ID 520 and the selected PC 522 to the accessed tag fields 516 (and an additional thread ID field, where this is not included within the tag field 516). If there is a match between the selected thread ID 520 and the selected PC 522 and the accessed tag fields 516 (and an additional thread ID field, where this is not included within the tag field 516), the corresponding data field 514 (i.e. the data field 514 from the same cache entry as the matching tag field 516) contains the required instruction. This instruction 524 is forwarded to the execution unit 704 (arrow 526) along with the selected thread ID 520 and the selected PC 522 (arrow 528).

In parallel to accessing the instruction cache, the JRC is also accessed using an index parameter (which may be different from the index parameter used to access the instruction cache) and one entry is read from each of the ways in the cache line within the JRC that is identified by the index parameter (which may be a subset of the bits of the PC). Each of these entries comprises a tag field and a data field and in the example shown in FIG. 7, there are 4 ways and so four data fields 714 (each arranged to store a predicted target PC) and four tag fields 716 are read. This requires that all the ways in the JRC are powered up. The tag fields in the JRC of a multi-threaded processor may comprise the most significant bits of the PC and the thread ID or the thread ID may be stored in a separate field which is also read.

The JRC way selection hardware logic 718 then compares the selected thread ID 520 and the selected PC 522 to the accessed tag fields 716 (and an additional thread ID field, where this is not included within the tag field 716). If there is a match between the selected thread ID 520 and the selected PC 522 and the accessed tag fields 716 (and an additional thread ID field, where this is not included within the tag field 716), the corresponding data field 714 (i.e. the data field 714 from the same JRC entry as the matching tag field 716) contains the required predicted target PC.

Where the instruction 524 is a register based jump instruction (as determined in the partial decode hardware logic 720), this is indicated to the JRC way selection hardware logic 718 (arrow 722) and this triggers the JRC way selection hardware logic 718 to send the predicted target PC to the program counter select logic 512 (arrow 724) so that the instructions at the predicted target PC can be fetched. The predicted target PC is also forwarded to the execution unit 704 (arrow 726) and stored (in a register 728).

As in FIG. 5, the execution unit 704 still computes the target address (i.e. the target PC) using hardware logic 508; however, it only sends a redirection notice (arrow 730) containing the computed target PC to the fetch unit 702 in the event that the computed target address does not match the predicted target PC (as stored in register 728). In such an event, the computed target address is used both to fetch the correct instruction (in hardware logic 512) and to update the JRC (arrow 732).

The above description of FIG. 7 assumes a cache hit in the JRC (i.e. that there is a matching entry in the JRC). If no matching entry is found by the JRC way selection hardware logic 718, then the processor operates as described above with reference to FIG. 5 and must wait until the execution unit computes the target PC and this is then stored in the JRC for future use. It will be appreciated that initially the JRC will be empty (i.e. there will be no predicted target PCs stored in the JRC) and the number of cache hits in the JRC will increase as the JRC becomes more populated with predicted target PCs.

Figure 8:
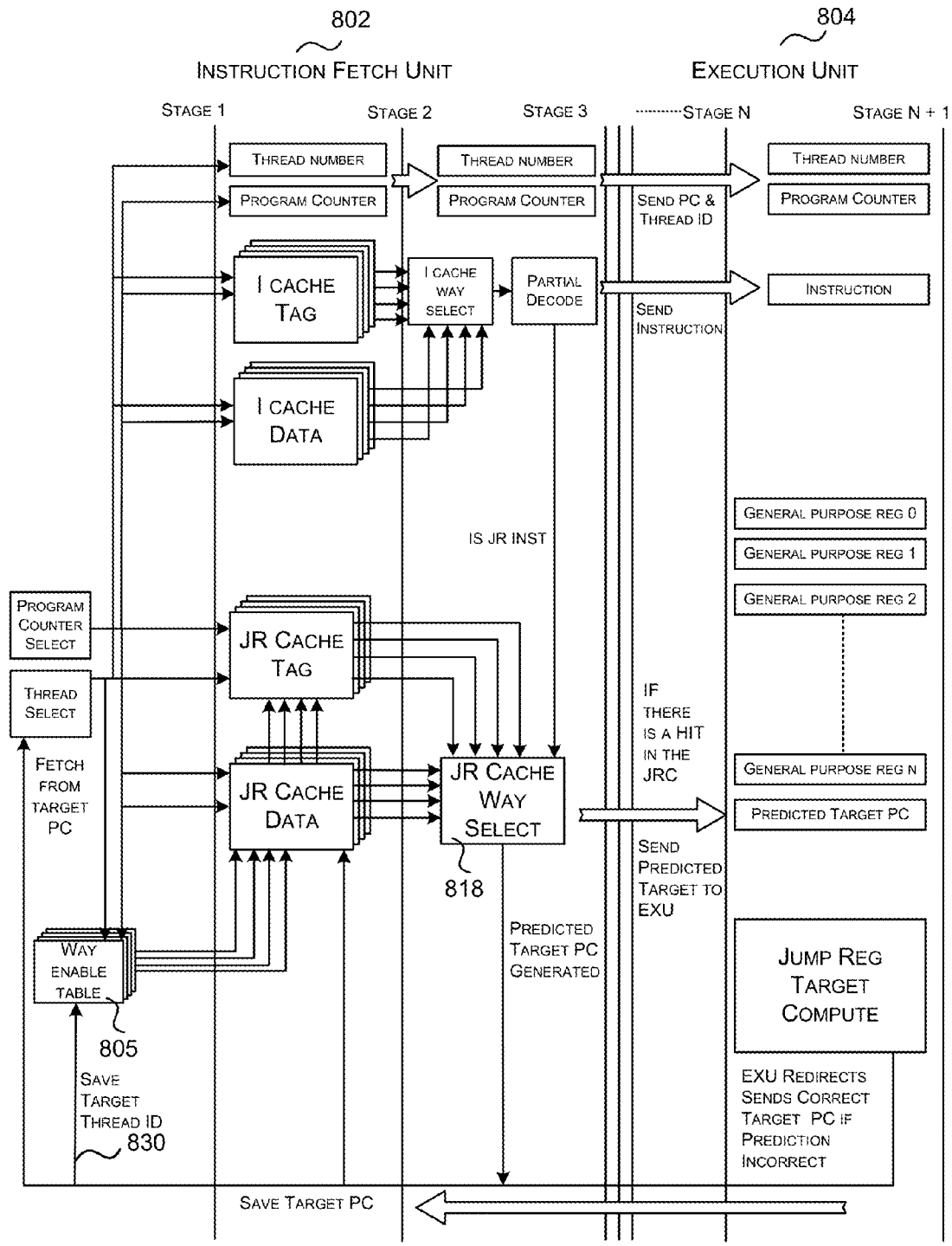
FIG. 8 shows the operation of a multi-threaded processor which uses selective way enabling for the jump register cache.

FIG. 8 shows the operation of a multi-threaded processor, such as the processor 400 shown in FIG. 4, which is a variation on that shown in FIG. 7 (as the processor comprises a jump register cache); however, in FIG. 8 the processor uses selective way enabling for the jump register cache (but not for the instruction cache). The operation is therefore similar to that described above with reference to FIG. 7; however, the way the JRC is used is different.

As shown in FIG. 8, the fetch unit 802 selects a thread (using hardware logic 510) and a program counter of an instruction to fetch for the selected thread (using hardware logic 512). As described above, the instruction cache is accessed using a first index parameter which comprises the least significant bits of the PC and using the PC selected (using logic 512) one entry is read from each of the ways in the cache line identified by the PC. The way selection hardware logic 518 then compares the selected thread ID 520 and the selected PC 522 to the accessed tag fields 516 (and an additional thread ID field, where this is not included within the tag field 516). If there is a match between the selected thread ID 520 and the selected PC 522 and the accessed tag fields 516 (and an additional thread ID field, where this is not included within the tag field 516), the corresponding data field 514 (i.e. the data field 514 from the same cache entry as the matching tag field 516) contains the required instruction. This instruction 524 is forwarded to the execution unit 804 (arrow 526) along with the selected thread ID 520 and the selected PC 522 (arrow 528).

In parallel to accessing the instruction cache, the way enable table 805 for the JRC is accessed using a second index parameter (which may be the same as or different from the first index parameter). Using the selected PC 522 (which was selected in logic 512) n entries are read from the way enable table 805, where the n entries which are read correspond to the n entries (one in each of n ways) in a cache line in the JRC identified using the second index parameter. Each of these n entries read from the way enable table 805 comprises a thread ID field and in the example shown in FIG. 8, there are 4 ways (n=4) and so four thread ID fields are read.

As described above with reference to FIGS. 2 and 3, the way enabling hardware logic compares the current thread ID (or thread number) 520 (as selected in logic 510) to the thread IDs in each of the n entries which were read from the way enable table 805 (where some of these entries may contain a thread ID and some may be empty) and where there is a match, the corresponding way in the JRC is enabled. Where there is no match, the corresponding way in the instruction cache is not enabled/disabled. As described above, the phrase 'corresponding way' refers to the way containing the entry in the JRC which corresponds to the particular entry in the way enable table 805 (where there is a 1:1 relationship between entries in the way enable table and the JRC itself).

The JRC is then accessed using the second index parameter and one or more entries may be read from the JRC. As described above, each of these entries comprises a tag field and a data field, but unlike the example shown in FIG. 7, even though there are still 4 ways, not all of these ways may be enabled (as a result of the actions of the way enabling logic) and so fewer than 4 entries (and so fewer than four data fields 714 and four tag fields 716) may be read. It will be appreciated that if all the thread IDs in the n entries read from the way enable table 805 match the current thread ID 520, then 4 entries will be read from the instruction cache; however, in a multi-threaded processor this is unlikely to occur often as generally there will be an approximately equal distribution between the threads.

The JRC way selection hardware logic 818 then compares the selected PC 522 to the accessed tag fields 716. If there is a match between the selected PC 522 and the accessed tag fields 716, the corresponding data field 714 (i.e. the data field 714 from the same JRC entry as the matching tag field 716) contains the required predicted target PC.

Where the instruction 524 is a register based jump instruction (as determined in the partial decode hardware logic 720), this is indicated to the JRC way selection hardware logic 718 (arrow 722) and this triggers the JRC way selection hardware logic 718 to send the predicted target PC to the program counter select logic 512 (arrow 724) so that the instructions at the predicted target PC can be fetched. The predicted target PC is also forwarded to the execution unit 704 (arrow 726) and stored (in a register 728).

As in FIG. 5, the execution unit 804 still computes the target address (i.e. the target PC) using hardware logic 508; however, it only sends a redirection notice (arrow 730) containing the computed target PC to the fetch unit 802 in the event that the computed target address does not match the predicted target PC (as stored in register 728). In such an event, the computed target address is used both to fetch the correct instruction (in hardware logic 512) and to update the JRC (arrow 732). Where the JRC is updated, the way enable table 805 for the JRC is also updated (arrow 830)

The above description of FIG. 8 assumes a cache hit in the JRC (i.e. that there is a matching entry in the JRC). If no matching entry is found by the JRC way selection hardware logic 818, then the processor operates as described above with reference to FIG. 5 and must wait until the execution unit computes the target PC and this is then stored in the JRC for future use. It will be appreciated that initially the JRC will be empty (i.e. there will be no predicted target PCs stored in the JRC) and the number of cache hits in the JRC will increase as the JRC becomes more populated with predicted target PCs.

Figure 9:
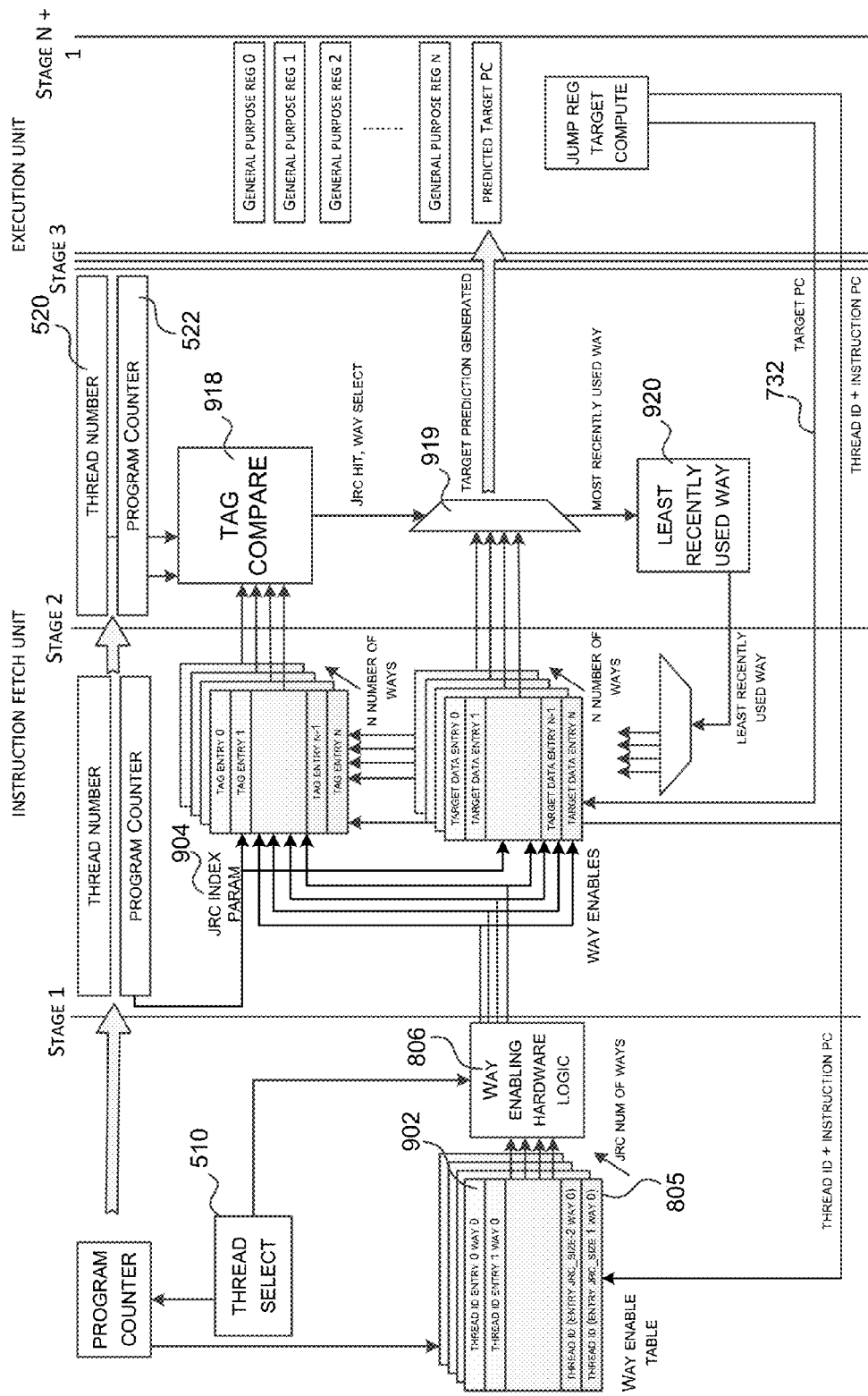
FIG. 9 is a schematic diagram which shows a more detailed example of the method shown in FIG. 8.

FIG. 9 is a schematic diagram which shows a more detailed example of the method shown in FIG. 8 and described above. In particular, it can be seen that the way enable table 805 for the JRC comprises a plurality of entries 902 with each entry corresponding with one of the entries in the JRC itself (in a 1:1 relationship). In this example, the index parameter which is used to index both the way enable table and the JRC is referred to as the 'JRC index parameter' and comprises a subset of the bits of the PC. In this example, the JRC tag comprises the thread ID and a subset of the bits of the PC. As shown in FIG. 9, the way enabling hardware logic 806 performs a comparison of thread ID, where the comparison is between the ID of the selected thread (from thread select logic 510) and the thread ID in the entries in the way enable table 805 which are identified by the JRC index parameter.

As also shown in FIG. 9, the JRC way selection hardware logic 818 performs a tag compare (in block 918) between the tags read from the enabled ways in the JRC and the program counter 522 (and in some examples also the current thread ID 520). If a match is identified (which is a JR cache hit), the way containing the matching tag is selected (in block 919) and the predicted target PC is identified and then used as described above with reference to FIG. 8. In addition, the data identifying the particular way containing the matching tag (which is now the 'most recently used way') is fed into logic 920 which keeps track of the least recently used way. The least recently used way is used to store the next update to the JRC in the event of a cache miss or in the event that the computed target address does not match the predicted target PC (arrow 732).

Figure 10:
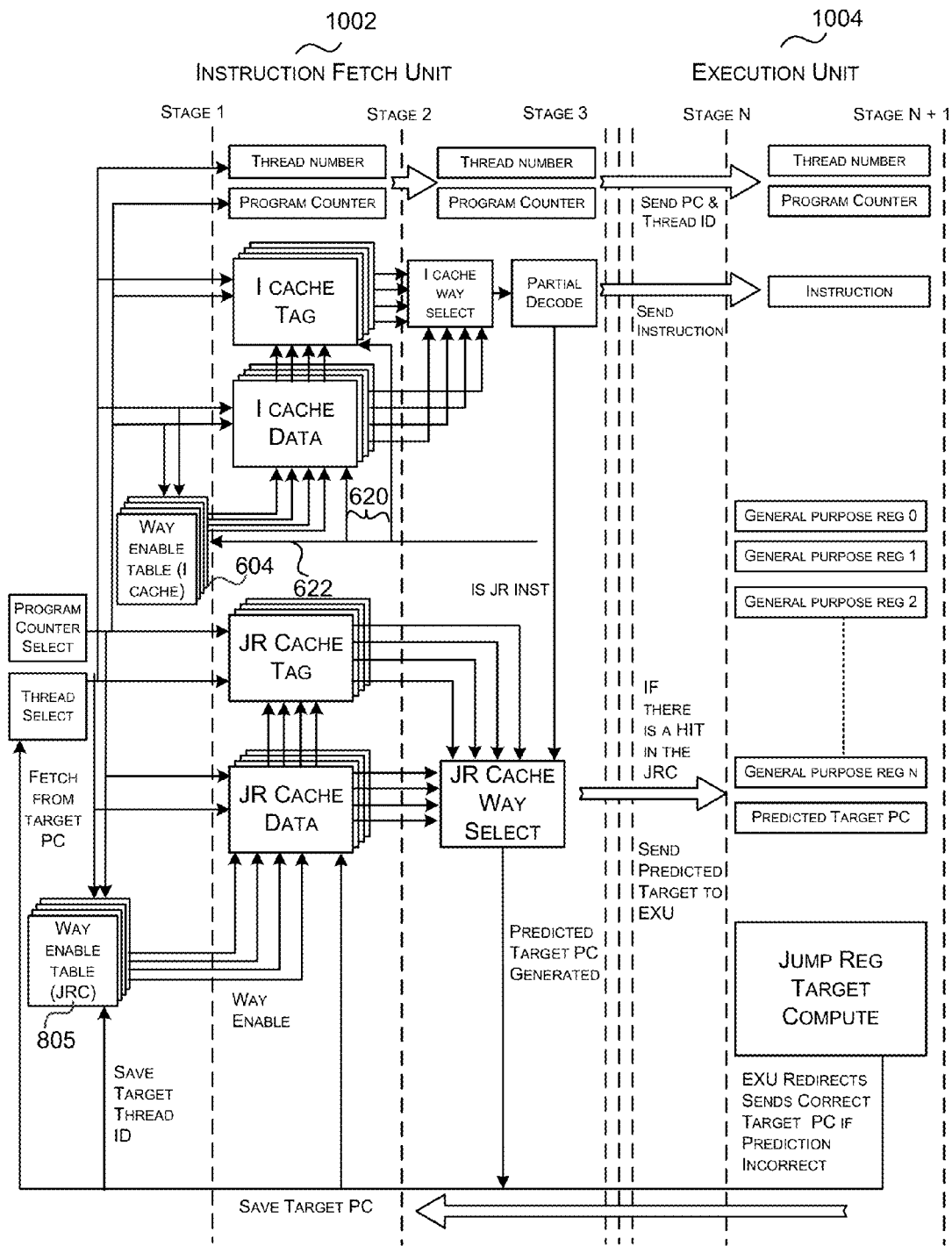
FIG. 10 shows the operation of a multi-threaded processor which uses selective way enabling for both the instruction cache and the jump register cache.

FIG. 10 shows the operation of a multi-threaded processor, such as the processor 400 shown in FIG. 4, which may be considered a combination of FIGS. 6 and 8 because the processor uses selective way enabling (in fetch unit 1002) for both the instruction cache (as in FIG. 6) and the jump register cache (as in FIG. 8). In this example, a first index parameter is used to index both the instruction cache and the way enable table 604 for the instruction cache and a second index parameter is used to index both the JRC and the way enable table 805 for the JRC, (i.e. the same index parameter is used for both a cache and its associated way enable table, but different caches may use different index parameters).

In the examples described above, each entry in a way enable table comprises only a thread ID field; however, in further examples, each entry may also comprise a validity bit. For a way to be enabled (e.g. in block 310 of FIG. 3) the thread ID must match ('Yes' in block 308) and additionally the validity bit needs to be set. By using a validity bit in this way, it is not necessary to initialize the cache.

As described above, the way enable table will typically be quite small and therefore may be implemented in registers, rather than RAM, which can be read without any cost in terms of power used. For example, for a 4-way cache (n=4) comprising 16 cache lines, the way enable table comprises 16×4 entries (i.e. 32 entries) and each entry may comprise only 2 bits, so the entire way enable table may only comprise 64 bits.

Where the way enable table is larger (e.g. a way enable table for a larger cache such as a data cache), the way enable table may be implemented in RAM. The power required to read from the way enable table is still lower than the power required to read from the cache itself (because the way enable table is still much smaller than the cache). The power required to read from the way enable table may, in various examples, be reduced further by only powering up one line in the way enable table (i.e. those entries identified by the index parameter) before reading from the way enable table.

By using the improved cache arrangement and methods as described herein, power can be saved when reading from a RAM based cache in a multi-threaded processor. Furthermore, the size of the cache can be reduced as the thread ID is no longer required; however, in some implementations, the thread ID may still be stored in the cache (e.g. the cache may, in some examples, not be modified despite the use of a way enable table). In other implementations, the thread ID may not be stored in the cache but instead of reducing the size of the cache, additional cache lines may be included, to provide better multi-threaded performance at a similar power cost.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

The term 'subset' is used herein to refer to a proper subset such that a subset does not include all the elements of a set.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A multi-threaded processor comprising:
    a set associative cache comprising a plurality of cache entries arranged in a plurality of lines across a plurality of ways, each line being identified by an index parameter, and each cache entry comprising a data field and a tag field;
    a way enable table comprising a plurality of way enable table entries arranged in the plurality of lines across the plurality of ways of the cache, each line corresponding to a line of the cache and being identified by the index parameter of the line of the cache, and each way enable table entry corresponding to a cache entry in the set associative cache such that there is a 1:1 relationship between way enable table entries and cache entries and each way enable table entry comprising a thread ID field arranged to store a thread ID identifying a sequence of one or more instructions associated with a data item stored in the data field of the corresponding cache entry; and
    hardware logic arranged to selectively enable ways in the set associative cache based at least in part on a comparison of a current thread ID and thread IDs stored in way enable table entries of a line in said way enable table identified by a received index parameter.

2. The multi-threaded processor according to claim 1, further comprising: hardware logic arranged to read cache entries in enabled ways in the set associative cache which are identified by the index parameter and to compare the tag field in each cache entry which is read to a reference value.

3. The multi-threaded processor according to claim 2, wherein the reference value is a program counter.

4. The multi-threaded processor according to claim 1, wherein the thread associated with a data item stored in the data field of the corresponding cache entry comprises a current thread ID at a time when the data item was stored in the data field of the corresponding cache entry.

5. The multi-threaded processor according to claim 1, wherein the set associative cache is implemented in a first type of memory and the way enable table is implemented in a second type of memory.

6. The multi-threaded processor according to claim 5, wherein the set associative cache is a RAM based cache and the way enable table is implemented in registers.

7. The multi-threaded processor according to claim 1, wherein an index value identifies one cache entry in each way in the set associative cache and the index value further identifies a subset of the way enable table entries, each way enable table entry in the subset corresponding to one of the identified cache entries.

8. The multi-threaded processor according to claim 1, wherein the set associative cache is an instruction cache.

9. The multi-threaded processor according to claim 1, wherein the set associative cache is a jump register cache.

10. The multi-threaded processor according to claim 1, further comprising:
- a second set associative cache comprising a second plurality of cache entries arranged in a second plurality of ways, each cache entry in the second set associative cache comprising a data field and a tag field;
- a second way enable table comprising a second plurality of way enable table entries, each way enable table entry in the second way enable table corresponding to a cache entry in the second set associative cache and comprising a thread ID field arranged to store a thread ID identifying a sequence of one or more instructions associated with a data item stored in the data field of the corresponding cache entry in the second set associative cache; and
- second hardware logic arranged to selectively enable ways in the second set associative cache based at least in part on a comparison of a current thread ID and thread IDs stored in way enable table entries in the second way enable table identified by a second index parameter.

11. The multi-threaded processor according to claim 10, wherein the set associative cache is a jump register cache and the second set associative cache is an instruction cache.

12. A method of accessing cache entries in a set associative cache in a multi-threaded processor, arranged in a plurality of lines across a plurality of ways with each lines being identified by an index parameter, and each cache entry comprising a data field and a tag field, the method comprising:
- accessing two or more way enable table entries in a way enable table identified by a received index parameter, the way enable table comprising a plurality of way table entries arranged in the plurality of lines across the plurality of ways of the cache, each line corresponding to a line of the cache and being identified by the index parameter of the line of the cache, and each way enable table entry corresponding to a cache entry in the set associative cache such that there is a 1:1 relationship between entries in the cache and entries in the way enable table and each way enable table entry comprising a thread ID field arranged to store a thread ID identifying a sequence of one or more instructions associated with a data item stored in the data field of the corresponding cache entry;
- for each accessed way enable table entry, comparing the stored thread ID and a current thread ID; and
- in response to the comparison identifying a match between the current thread ID and the stored thread ID in a way enable table entry, enabling the way in the set associative cache containing the corresponding cache entry.

13. The method according to claim 12, further comprising: in response to the comparison identifying no match between the current thread ID and the stored thread ID in a way enable table entry, disabling the way in the set associative cache containing the corresponding cache entry.

14. The method according to claim 12, further comprising: reading cache entries in enabled ways in the set associative cache which are identified by the index parameter.

15. The method according to claim 12, further comprising:
- in response to an update to a cache entry in the set associative cache, updating the thread ID stored in the way enable table entry which corresponds to the updated cache entry.

16. A non-transitory computer readable storage medium having stored thereon computer readable instructions that, when executed at a computer system for generating a representation of an integrated circuit from definitions of circuit elements and data defining rules for combining those circuit elements, cause the computer system to generate the processor as set forth in claim 1.

17. A non-transitory computer readable storage medium having encoded thereon computer readable instructions that, when executed at a computer system for generating a representation of an integrated circuit from definitions of circuit elements and data defining rules for combining those circuit elements, cause the computer system to generate a processor configured to:
- access two or more way enable table entries in a way enable table identified by an index parameter, the way enable table comprising a plurality of way enable table entries arranged in a plurality of lines across a plurality of ways, each line corresponding to a line of a set associative cache and being identified by an index parameter of a line of the cache, and each way enable table entry corresponding to a cache entry in the cache such that there is a 1:1 relationship between way enable table entries and cache entries, the set associative cache comprising a plurality of cache entries arranged in a plurality of lines across a plurality of ways, each line being identified by an index parameter and each cache entry comprising a data field and a tag field and each way enable table entry comprising a thread ID field arranged to store a thread ID identifying a sequence of one or more instructions associated with a data item stored in the data field of the corresponding cache entry;
- compare the stored thread ID and a current thread ID for each accessed way enable table entry; and
- in response to the comparison identifying a match between the current thread ID and the stored thread ID in a way enable table entry, to enable the way in the set associative cache containing the corresponding cache entry.

* * * * *